(12) United States Patent
Briand et al.

(10) Patent No.: US 8,121,055 B2
(45) Date of Patent: Feb. 21, 2012

(54) METHOD OF COLLECTION OF QUALITY STATISTICS AND CORRESPONDING METHOD OF MANAGEMENT OF COLLECTION OF QUALITY STATISTICS

(75) Inventors: François-Yves Briand, Nouvoitou (FR); Gilles Straub, Acigne (FR); Jean-Claude Colmagro, Mouaze (FR)

(73) Assignee: Thomson Licensing, Boulogne-Billancourt (FR)

( * ) Notice: Subject to any disclaimer, the term of this patent is extended or adjusted under 35 U.S.C. 154(b) by 366 days.

(21) Appl. No.: 12/583,665

(22) Filed: Aug. 24, 2009

(65) Prior Publication Data
US 2010/0054134 A1    Mar. 4, 2010

(51) Int. Cl.
*H04L 12/28* (2006.01)
(52) U.S. Cl. ........................ 370/255; 370/252
(58) Field of Classification Search .......... 370/252, 370/332, 372, 377, 384, 389, 410, 235, 236, 370/255
See application file for complete search history.

(56) References Cited

U.S. PATENT DOCUMENTS

| | | |
|---|---|---|
| 2005/0013300 A1* | 1/2005 | Akahane et al. ........... 370/395.3 |
| 2005/0276230 A1* | 12/2005 | Akahane et al. ............... 370/252 |
| 2009/0011768 A1* | 1/2009 | Seok et al. .................... 455/450 |

FOREIGN PATENT DOCUMENTS

| | | |
|---|---|---|
| WO | WO 2006/097832 | 9/2006 |
| WO | WO 2007/128097 | 11/2007 |

OTHER PUBLICATIONS

Quacchia, Lupton and Straub: "TR-135. Data Model for a TR-069 Enabled STB" Broadband Forum Technical Report, [Online] vol. 1, No. TR-135, Dec. 31, 2007, XP002512769 Retrieved from the Internet: URL: http://www.broadband-forum.org/technical/download/TR-135.pdf> [Retrieved on Jan. 30, 2009] *p. 46-p. 47* *p. 57-p. 62* *p. 91, paragraphs CH, I.2.2-p. 95, paragraphs CH, I.3.4.2*.

Search Report dated Jan. 30, 2009.

* cited by examiner

*Primary Examiner* — Brenda H Pham
(74) *Attorney, Agent, or Firm* — Robert D. Shedd; Joseph J. Opalach; Jerome G. Schaefer

(57) ABSTRACT

The invention relates to the field of telecommunication and more particularly, to the acquisition of a statistics related to quality related to data reception, for instance quality of service and/or quality of user experience of digital audio and/or video services. In particular, the objective of the present invention is to improve the collection of quality statistics.

15 Claims, 11 Drawing Sheets

| 200 | Data model object | | |
|---|---|---|---|
| 201 | .STBService.{i}.ServiceMonitoring.MainStream.{i}.Sample | | |
| 202 | Data model attribute | | |

| | 203 Name | 204 Type | 205 Use |
|---|---|---|---|
| 206 | UserSampleSeconds | String 207 | See specification text 208 |
| 209 | TestSampleSeconds | String 210 | See specification text 211 |

Fig. 2

| | Data model object |
|---|---|
200

| | .STBService.{i}.Capabilities.ServiceMonitoring. |
|---|---|
301

| | Data model attribute |
|---|---|
202

| Name | Type | Use |
|---|---|---|
| ServiceType | String | See specification text |

| 200 | Data model object |
|---|---|
| 401 | .STBService.{i}. ServiceMonitoring. |
| 202 | Data model attribute |

| | Name (203) | Type (204) | Use (205) |
|---|---|---|---|
| 406 | AutoMonitor | Boolean (407) | See specification text |
| | | (408) | |
| 409 | SampleEnable | Boolean (410) | See specification text |
| | | (411) | |

Fig. 4

METHOD OF COLLECTION OF QUALITY STATISTICS AND CORRESPONDING METHOD OF MANAGEMENT OF COLLECTION OF QUALITY STATISTICS

This application claims the benefit, under 35 U.S.C. §119, of European Patent Application No. 08305518.6 of 2 Sep. 2008.

1. FIELD OF INVENTION

The invention relates to the field of telecommunication and more particularly, to the acquisition of a statistics related to quality related to data reception, for instance quality of service and/or quality of user experience of digital audio and/or video services.

2. TECHNICAL BACKGROUND

According to prior art, a device is connected to a network that provides services such as audio and/or video services. The network transporting these services can include various equipments such as transmitters, modulators, demodulators, routers, switches, DSLAMs (Digital Subscriber Line Asynchronous Multiplexer), modems. These equipments are interconnected by wired and/or wireless connections that may influence the reception quality of a device. The reception quality may in turn influence the quality of user experience of a user using the device; the quality of user experience being the quality experienced by the user of the device when rendering of the service. A difference is made between quality of reception and quality of user experience. For example, when a device receives a service subject to the loss of a relatively small number of packets, but the packets that are lost concern I (Intra) type packets in a H.264 encoded stream, the impact on the service rendering can be important, since the decoder in the device can not use other packets that depend on the I type packets such as B or P type packets, even when these packets are correctly received. Then, the loss of a relatively small number of packets can cause the apparition of visible artifacts such as macro-blocks. As for Quality of Service, Quality of Experience is measurable. For example, quality of experience can be measured in channel change time and the number of macro-blocks in a video per time-entity, or the number of drop-outs in an audio rendering.

Throughout this document, the terms QoS, for Quality of Service, which corresponds to quality of reception and QoE, for Quality of Experience which corresponds to quality of user experience are being used.

Throughout the rest of this document, the general term quality statistics is used, that comprise QoS and QoE statistics.

Due to differences in the network path that a same service provided to different devices traverses, different devices can be subject to different QoS and QoE. In addition, for a same QoS, different user devices can have different QoE due to differences in the quality of the rendering or the decoding of the device.

Therefore, methods exist that allow a provider of services to devices to acquire statistics related to the QoS/QoE of digital audio and video services. For example, document TR-135 Issue 1 (TR for Technical Report, a series of documents issued by the Broadband Forum, formerly DSL Forum), specifies a mechanism to monitor QoS and QoE of an IPTV (Internet Protocol TeleVision) service. TR-135 is part of the TR-069 series of specifications, where TR-069 specifies a protocol that allows the remote management of devices.

The drawback of the prior art, represented for example by documents TR-069 and TR-135 Issue 1, is that the prior art allows collecting QoS monitoring statistics for IPTV networks but these statistics are subject to the behavior of the user of the device of which statistics are collected. There is no way to get quality statistics of device during a period of non-activity of the device, and thus it is not possible to get quality statistics during a period that is free of any user action. Furthermore, there is no way to get quality statistics over a same time period from several devices.

3. SUMMARY OF THE INVENTION

The present invention aims at alleviating the inconveniences of prior art.

In particular, the objective of the present invention is to improve the collection of quality statistics.

The invention relates more particularly to a method of collection of quality statistics, characterized in that the method comprises a step of reception of a signal comprising an information representative of a mode of collection of quality statistics, so-called requested mode, the requested mode having at least two possible values comprising one first mode and one second mode;

If the requested mode is the first mode, entering in the first mode;

If the requested mode is the second mode, entering in the second mode;

In the first mode, connection to a test stream upon reception of a signal comprising a request for connection to the test stream;

In the second mode, automatic connection to a test stream whenever resources of a device needed for collection of quality statistics are available.

The method also comprises a step of collection of quality statistics when quality statistics collection has been enabled by reception of a signal enabling the quality statistics collection and when the device is connected to a stream.

According to a particular embodiment of the invention, the test stream of the second mode is a parameter that is configurable by a device different the device needed for collection of quality statistics.

According to a particular embodiment of the invention, the resources of a device needed for collection of quality statistics collection are considered to be available when a connection to the test stream and a collection of quality statistics on the test stream does not impact the quality of service rendering by the device.

According to a particular embodiment of the invention, the resources of a device needed for collection of quality statistics collection are considered to be available when the device is not connected to a stream coming from a Wide Area Network.

According to a particular embodiment of the invention, the resources of a device needed for collection of quality statistics collection are made available in a stand-by state of a device.

The invention also relates to a method of management of collection of quality statistics. It comprises a step of sending of a signal to at least one collecting device comprising an information representative of a mode of collection of quality statistics, so-called requested mode, the requested mode having at least two possible values comprising a first mode and a second mode, and a step of, in the first mode, sending of a request signal to at least one collecting device comprising a request for connection to a test stream;

In the first mode, a connection of a collecting device to a test stream is made upon reception of the request signal; and In the second mode, a connection of a collecting device to the test stream is automatically made whenever resources of the collecting device are available.

According to a particular embodiment of the invention, the method comprises a step of reception of collected quality statistics from at least one collecting device.

According to a particular embodiment of the invention, the method comprises a step of sending of information representative of a collection interval, to at least one collecting device.

According to a particular embodiment of the invention, a signal requesting a connection to a test stream is sent to at least one collecting device.

According to a particular embodiment of the invention, the quality statistics are classified according to the type of stream for which said quality statistics apply.

According to a particular embodiment of the invention, the type of stream comprises a test type stream and a user-selected type stream.

According to a particular embodiment of the invention, the quality statistics belong to a set comprising quality of service and quality of experience.

According to a particular embodiment of the invention, the quality statistics concern audio and video type services.

4. LIST OF FIGURES

More advantages of the invention will appear through the description of particular, non-restricting embodiments of the invention. The embodiments will be described with reference to the following figures:

FIGS. 2 to 4 shows example data models according to particular embodiments of the invention.

5. DETAILED DESCRIPTION OF THE INVENTION

Figure 1:
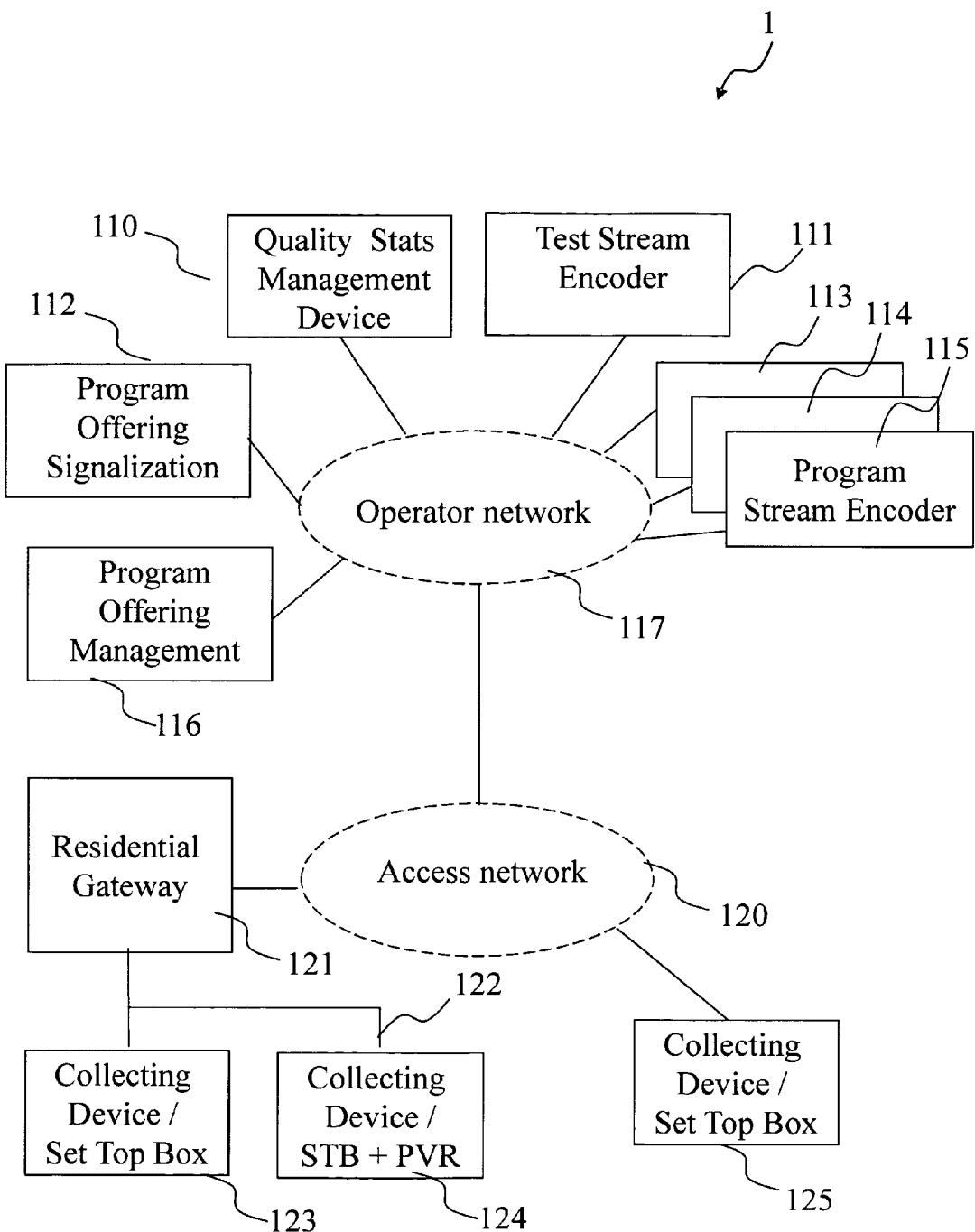
FIG. 1 shows an example network infrastructure that is compatible with the invention.

TR-135 Issue 1 specifies a data model that can be implemented by a device such as an end-user device. The data model comprises a wide range of parameters that reflect statistics. In short, a data model describes amongst others classes and attributes of a device, relations between these classes. Attributes of classes can be writeable, readable, readable only. Classes of the data model are organized in a hierarchy and have attributes. Instances of classes are called objects. For example, if a remote management device wants to change the value of the SampleEnable attribute of the ServiceMonitoring class into TRUE, the data model specifies that an object exists for this purpose which is referred to as .STBService.{i}.ServiceMonitoring, with an attribute SampleEnable of type Boolean, and a description of what the effect of setting the attribute to a particular value is. The object name .STBService{i}.ServiceMonitoring means that the SampleEnable attribute is an attribute of the ServiceMonitoring class that in turn is a subclass of the STBService class. Classes have instances, i.e. physical representations, called objects; therefore, the term "{i}" that follows the .STBService class name and that is positioned before the dot indicates that there can potentially be zero or more STBService objects present of the object of which the class name is specified after the term. One can thus change the value of the SampleEnable attribute in a Set Top Box for a specific audio or video service "i".

Attribute values and object contents can be accessed in a device by various means. According to an embodiment of the invention, attribute values and object contents of a data model implemented by a collecting device are accessed by the sending of messages and requests. According to a variant embodiment of the invention, attribute values and object contents are accessed by a connection to a database agent on the device. According to a variant embodiment of the invention, attribute values and object contents are accessed by plain text messages sent over an IP-socket. According to a variant embodiment of the invention, attribute values and object contents are accessed using HTTP (Hyper Text Transmission Protocol). According to a variant embodiment of the invention, attribute values and object contents are accessed using a web interface. These embodiments are not exclusive, i.e. all of the preceding embodiments may be combined in a particular embodiment. Other embodiments using other, non described means to access the values and the objects are possible and are not excluded.

TR-135 Issue 1 further specifies a configurable sample interval i.e. an interval of time during which quality statistics are collected. All the statistics are then calculated over this sample interval using counters. When a sample interval is finished, a counter value is called a report, and a report is then stored in the memory of the device. TR-135 Issue 1 then defines a method to retrieve the reports for the various counters.

A specificity of TR-135 Issue 1 is that statistics are calculated by a device during the period of activity of the device: for example, when the device is receiving a video, statistics are calculated, when the device is not receiving any video, the counters are not computed.

To differentiate the period of data reception from the period where no data is received, a parameter is present in the TR-135 Issue 1 data model, called SecondSample. This parameter indicates for how many seconds within the sample interval the device has been computing statistics. TR-135 Issue 1 also specifies a method to force a device to connect to a test stream for various purposes. One possible goal of this test stream is to force the collection of statistics on a reference stream for ad-hoc testing, for example, during a direct intervention by a hotline operator on the device of a client. However, when the client changes channel, or when he shuts down his device, statistics are no longer collected from the reference stream or respectively not collected at all.

TR-135 Issue 1 Section 1.3 gives an overview of the "service monitoring" feature that corresponds to the collection of quality statistics.

Throughout the rest of this document, the term "device" or "collecting device" is used, that comprises end-user devices and intermediate devices, adapted to collect quality statistics according to the method of collection of quality statistics. An end-user device is a device with which a user interacts directly by means of an interaction means such as a remote control or a keyboard, for example a Set Top Box; an intermediate device comprises gateways, proxies, switches and other network equipment.

According to the invention, at least two modes of quality statistics collection are defined for device operation: a first, NON-AUTOMATIC-MONITOR mode and a second, AUTOMATIC-MONITOR mode, also called "first" and "second" modes.

In the NON-AUTOMATIC-MONITOR mode, a device performs statistic computation over sample intervals when it is connected to any stream.

When the AUTOMATIC-MONITOR mode is activated on a device, the device automatically switches to a determined test stream from which to collect quality statistics, as soon as the device detects that its resources needed for the connection to the predefined test stream are available. This mode allows providing a continuous quality statistic computing over time.

According to a particular embodiment of the invention, resources are considered to be available when a connection to a test stream and a collection of quality statistics on the test stream does not impact quality of service rendering of the device. This is for example the case when the user of a device does not use the network interface needed to connect to the test stream by starting to play a video from an embedded PVR, or when the user is not receiving any stream coming from the WAN (Wide Area Network) on the network interface but is only playing a stream from the LAN (Local Area Network) and if there are resources available on the network interface to receive a test stream in addition to the LAN stream.

According to a particular embodiment of the invention, the distinction between a stream coming from the WAN and a stream coming from the LAN is done by looking at the source IP address of the stream. If the source IP address belongs to the same subnet as the own address of the collecting device, then the stream is coming from the LAN and not from the WAN.

According to a particular embodiment of the invention, the collecting device is of a hybrid type, having two types of interfaces, for example wireless DTT (Digital Terrestrial Television) and IPTV over a wired ADSL connection. Then, resources for connection to a test stream and for collection of statistics are available when the collecting device frees the IPTV-ADSL interface when it activates the DTT interface.

These particular embodiments can be combined to form a particular embodiment with particular advantages.

Other examples of avoiding impact on the quality of service rendering of the collecting device are given further on in this specification.

In another particular embodiment of the invention, the needed resources for collection of quality statistics are made available when the device goes in standby mode, by defining a special standby mode in which only the needed components of the device remain active. Of course, to be able to keep the resources needed for quality statistics collection in standby mode, a device implementing the invention supports this special standby mode. Current state of the art shows that it is commonplace to keep selected components active in a standby state without the user being aware of the fact that his device is still partially functioning in a standby state. This special standby mode is differentiated from a real standby mode where only the minimum components are active in order to be able to awake the device on a command from the user.

The invention also introduces a configuration means allowing a management of collection of quality statistics comprising the sending of an information representative of a mode of collection of quality statistics, where the monitor modes comprise NON-AUTOMATIC-MONITOR-MODE and AUTOMATIC-MONITOR mode.

The invention also introduces a way to classify quality statistics. Each collected statistic is classified according to whether the device was connected to a test stream or whether the device was receiving a user selected stream. This classification according to the type of stream is done for instance by indicating the number of seconds it was collecting data on a test stream, and the number of seconds it was collecting statistics from a connection to a user-selected stream. This is useful in order to correlate possible error events with the user experience: errors happening on a test stream are not visible to the user, or at least do not impact the user experience. According to a particular embodiment of the invention, this problem is solved by adding a particular set of parameters to the TR-135 Issue 1 data model, namely UserSampleSecond and TestSampleSecond. UserSampleSecond is defined as being the number of seconds during which data was collected during a sample interval when connected to a user-selected stream. TestSampleSecond reflects the number of seconds during which data was collected during a sample interval when the device was connected to a test stream. According to another embodiment of the invention, an extra ServiceType with a value "TEST" is added to the existing TR-135 Issue 1 data model. The usage of the ServiceType parameter is explained in TR-135 Issue 1. According to this embodiment, when the device collects statistics, they are stored in a specific instance of the TR-135 Issue 1 MainStream data model object of a specific ServiceType that corresponds to the type of stream, i.e. user-selected or test. If statistics are collected when the device is connected to a test stream, the statistics are stored in a MainStream object that has its ServiceType attribute set to "TEST"; if statistics are collected when the device is connected to a user-selected stream, the statistics are stored in another MainStream object that has its ServiceType attribute set to one of the types defined in the existing data model like "IP", "IPTV" or "VoD".

FIG. 1 shows an example network infrastructure that is compatible with the invention and that includes a quality statistics management device and a plurality of devices suited for collecting quality statistics;

The infrastructure comprises:
a program offering management server 116;
a program offering signalisation server 112;
a quality statistics management device 110;
a test stream encoder 111;
program stream encoders 113, 114 and 115;
an operator network 117;
an access network 120;
gateway device 121;
LAN 122; and
Set Top Box collecting devices 123, 124 and 125.

An operator of services provides services to devices such as 123, 124 and 125. These services are provided via the gateway 121 for devices 123 and 124, or directly to device 125, through the access network 120 and through the operator's network 117 and via the equipment of the operator that is connected to the operator's network.

Device 121 is a gateway that serves as an access point to the access network for devices 123 and 124 that are connected in a LAN. Devices 123, 124 and 125 are Set Top Boxes i.e. receivers of AV services. Device 124 is a Set Top Box as device 123 but with additional PVR (Personal Video Recorder) capability. Devices 123 and 124 and 121, are connected into a LAN, that allows devices 123 and 124 to use each other's services, for example device 124 can provide PVR services to device 123, for example to playback a recorded video. The gateway 121 provides network address translation services so that devices 123 and 124 can access the operator network 117 and its services. Gateway 121 has an interface adapted to a connection to the access network, which is of the ADSL type, whereas it interfaces with devices 123 and 124 via an IP interface.

Device 125 is directly connected to the access network 120 and therefore is provided with an interface adapted to that network.

The WAN is represented here by the access network 120 and the LAN is represented here by the local network 122.

First of all, the devices 123, 124 and 125 connect to the program offering management server in order to identify themselves and retrieve the address of signalization server 112 where a list of available services can be retrieved. Then, the devices can connect to any of the streams that are provided by program stream encoders 113, 114 and 115. The devices 123, 124 and 125 are capable of receiving and decoding the services offered by the operator.

Operator network 117 further comprises a quality statistics management device 110 that allows the operator to collect quality statistics from devices 123, 124 and 125.

The devices, 123, 124 and 125 are further capable of receiving signals that instruct them to collect the desired quality statistics and to store these in memory that can be read by the quality statistics management device 110.

According to a particular embodiment, the quality statistics management device and the device reading collected quality statistics is not the same device. This feature allows separating tasks and using dedicated equipment that is adapted to the type of task.

The devices 123, 124 and 125 are further capable to receive a signal to connect to a test stream provided by test stream encoder 111.

Dynamically, the quality statistics management device 110 collects quality statistics from devices 123, 124 and 125 in the following way: the quality statistics management device 110 sends a signal to at least one of the devices 123, 124 and 125. This signal can have values comprising two modes of statistics collection, a first mode being NON-AUTOMATIC-MONITOR and second mode being AUTOMATIC-MONITOR. After a period of time, the quality statistics management device 110 can collect the statistics collected by the devices 123, 124 and 125. According to a particular embodiment, a signal is sent to one or more devices 123, 124 and 125 indicating a request for a connection to a test stream. This feature has the advantage to allow the immediate testing of several devices 123, 124 and 125 at the same time. According to a particular embodiment, the quality statistics collected from the devices 123, 124 and 125 are classified according to the type of stream for which the statistics apply. This feature allows relating errors to stream types. According to a particular embodiment, the stream type comprises at least one test type stream and at least one user-selected type stream. This feature allows knowing whether any errors were observed by the user or not.

The device 123, 124 and 125 collect quality statistics as follows. They receive a signal comprising an information representative of a mode of quality statistics collection, first (i.e. NON-AUTOMATIC-MONITOR) or second (i.e. AUTOMATIC-MONITOR). The devices 123, 124 and 125 enter the mode that corresponds to the signal received. In first, NON-AUTOMATIC-MONITOR mode, a connection is made to a specified test stream upon reception of a signal comprising a request for connection to the test stream, and collection of statistics is done when the collection is enabled by the reception of an enabling signal and when the device is connected to a stream. In the second, AUTOMATIC-MONITOR mode, an automatic connection to a test stream is done whenever the resources of the device, needed for the collection of quality statistics are available. According to a particular embodiment of the invention, the test stream of the second mode is a parameter that is configurable by a device different than the device collecting the quality statistics. This feature allows changing the test stream, collecting statistics from a different type of stream, and observing the results. According to a particular embodiment, the resources are considered to be available when a connection to the test stream and a collection of statistics does not impact the quality of service rendering of the device; that is, the quality of the services that the device renders. This feature has the advantage to procure seamless functioning of the device, whatever it is doing, without being in any way perturbed by the collection of quality statistics or by the connection to the test stream. For example, the statistics collection does not load the CPU of the device with a charge that delays the channel change time, or the connection to the test stream does not reduce the bandwidth available for the user-selected stream that a user is visualizing or recording. According to a particular embodiment of the invention, the resources needed for collection of quality statistics collection are made available in standby mode. This feature allows collecting statistics over a long period of time, without impacting the quality of service rendering of the device. Advantageously according to a variant embodiment, the resources needed for quality statistic collection are considered to be available when said device is not connected to a stream coming from a Wide Area Network. This feature allows, for a collecting device connected to a WAN, a fast means to determine if the needed resources are available.

According to a variant embodiment, the gateway device 121 is itself an intermediate collecting device, which collects quality statistics over the devices that are connected to its LAN. According to a particular embodiment of the invention, the intermediate collecting device is a collecting device for the quality statistics management device, and is a quality statistics management device to the collecting devices connected to its LAN. Then, intermediate collecting device implements both the method of statistics collection and the method of management of statistics collection according to the invention.

FIG. 2 shows an example data model according to a particular embodiment of the invention. This example data model uses the data model of the TR-135 specification as a framework. The data model described in the TR-135 specification allows remote management of Digital Television functionality in a Set Top Box. The use of SampleSecond and SampleSecond parameters according to the invention allow a device that handles or reads the statistics to distinguish between statistics collected while connected to the test stream or not.

In FIGS. 2, 3 and 4, the data model is described in a table form, which shows the class to which an attribute belongs, the object name and the class hierarchy in the datamodel (201), and specific attributes of the class with the attribute name (203), attribute type (204) and attribute usage description (205). Referring to FIG. 2, element 200 introduces the object that is described here and that can be found in element 201. Element 202 introduces the data model attributes described in table entries 206, 207, 208, 209, 210 and 211.

According to the particular embodiment illustrated by this figure, a detail of a data model is shown for the .STBService{i}.ServiceMonitoring.MainStream {i}.Sample object. In TR-135 Issue 1, collected statistics are called samples. In order to be able do distinguish between the duration that quality statistics were collected on a user-selected stream and the duration that quality statistics were collected on a test stream, the data model according to the invention introduces two distinct SampleSecond attributes, namely "UserSampleSeconds" and "TestSampleSeconds".

The UserSampleSeconds attribute is a comma-separated list where each entry in the list is the number of seconds during which quality statistics were collected while connected to a user-selected stream.

The TestSampleSeconds attribute is a comma-separated list, where each entry in the list is the number of seconds during which quality statistics were collected while connected to a test stream.

FIG. 3 shows a variant on the data model of FIG. 2 according to a particular embodiment of the invention, where the use of ServiceType allows a device that handles or reads the statistics to distinguish between statistics collected while connected to the test stream or not.

As for FIG. 2, the data model is described in a table form. The common elements with FIG. 2 have already been explained above and thus will not be further described here.

In this embodiment, the differentiation between the duration that samples, i.e. quality statistics, are collected on a user-selected stream and on a test stream, is done using an augmented ServiceType attribute of the .STBService.{i}.Capabilities.ServiceMonitoring object of the TR-135 Issue 1 specification. The ServiceType attribute is augmented to support a differentiation classification between user-selected streams and test stream. To store collected quality in different objects according to the type of stream the proceeding is as follows: several instances of MainStream objects are created by the collectioning device. Information that these objects contain can be read by external devices such as a quality collection managing device. One instance has its ServiceType attribute set to a value reflecting the service is a test stream (for instance "TEST"), another instance has its ServiceType attribute set to a value to indicate that the service is a user selected stream (for instance "IPTV-User"). For quality statistics collected while connected to a test stream, the instance of the MainStream object of FIG. 2 (reference 201) with its ServiceType attribute set to "TEST" is used to store the statistics. For quality statistics collected while connected to an IPTV user-selected stream, the instance of MainStream object with the ServiceType attribute set to "IPTV-User" is used to store the statistics.

The ServiceType attribute is of the string type, and is a comma separated list of supported service types, each of which relates to a stream source. Each item is taken from a list comprising:

IPTV-User: a user-selected IPTV stream originating from a WAN;
VoD-User: a user-selected Video on Demand stream originating from a WAN;
IP-User: any of the above (IPTV-User or VoD-User) user-selected streams originating from a WAN;
TEST: a test stream originating from the WAN that was specified by setting the URI attribute of the .STBService{i}.Components.FrontEnd{i}.IP.ServiceConnect object;
IP-ALL: Any type of IP stream originating from the WAN, comprising user-selected streams, IPTV and VoD;
CAB—a stream originating from a cable tuner;
DTT—a stream originating from a Digital Terrestrial Television tuner;
SAT—a stream originating from a satellite tuner;
PVR—a stream originating from a Personal Video Recorder.

According to a different embodiment of the invention, and instead of augmenting the set of values of the ServiceType parameter, a new parameter is added that is called for instance SubServiceType that is used in addition to the existing TR-135 Issue 1 ServiceType parameter, which takes one of the values "USER" or "TEST". The SubServiceType, used together with the legacy (TR-135 Issue 1) ServiceType parameter allows distinguishing two different instances of a MainStream object, one dedicated to user selected stream, one dedicated to a test stream.

FIG. 4 shows an embodiment of the differentiation between the first and second mode of statistics collection. It is implemented in a device compatible with the invention such as any of the devices 123, 124 or 125. As for FIGS. 2 and 3, the data model is described in a table form. The common elements with FIGS. 2 and 3 have already been explained above and thus will not be further described here.

The TR-135 Issue 1 data model that is used as a framework for this particular embodiment of the invention has been augmented with the introduction of a new attribute, namely "AutoMonitor" 406, which is of type "Boolean" 407. When a quality statistics management device sets the AutoMonitor attribute of the .STBService.{i}.ServiceMonitoring object 401 to the Boolean value "TRUE", it requests the collecting device of which the attribute is set to enter the quality statistics collection mode of AUTOMATIC-MONITOR. Otherwise, when the AutoMonitoring attribute is set to "FALSE", the quality statistics management device requests the collecting device to enter the first statistics collection mode that is NON-AUTOMATIC-MONITOR. The meaning of these two modes has already been explained previously in this document and is therefore not explained further.

The SampleEnable attribute, when set to TRUE by a quality monitoring device, is an enabler for quality statistics collection.

The figure shows an embodiment of the invention, where the test stream of the second mode is a parameter that is configurable by a device different than the device collecting the quality statistics, illustrated by message 501.

Figure 5:
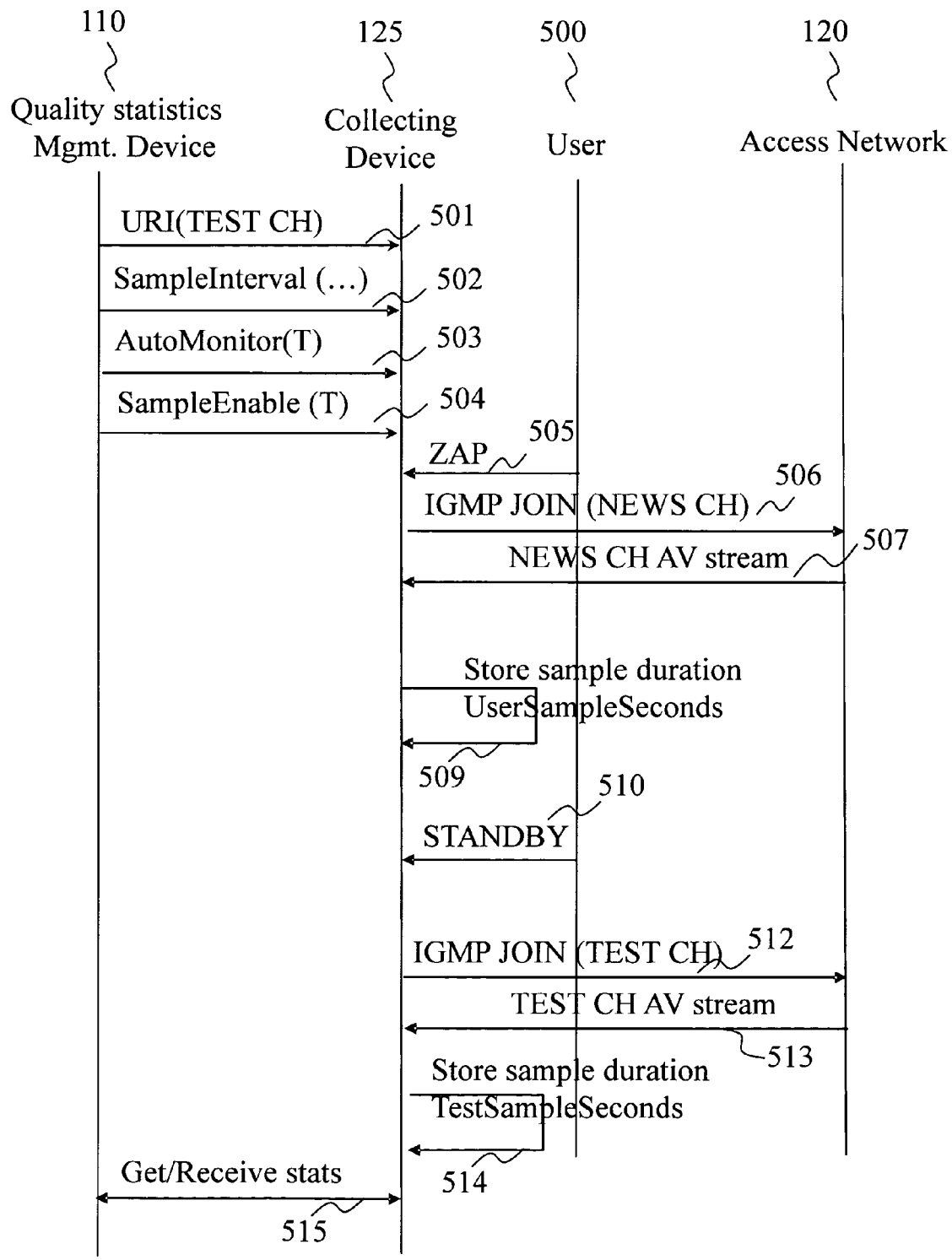
FIGS. 5 to 7 shows message exchanges between the devices of the infrastructure of FIG. 1 where the data model of FIGS. 2 to 4 are put into application.

FIG. 5 shows an exchange of messages between the devices of the network infrastructure of FIG. 1 and the user, of an embodiment of the invention using the data model as illustrated by FIG. 2. Illustrated by FIG. 5 is the second statistics collection mode, called AUTOMATIC-MONITOR mode. The vertical bars in the diagram represent, from left to right, the quality statistics management device 110, quality statistics collecting device 125, user 500, and access network 120. The horizontal arrows represent messages or signal exchanges or actions.

The exchange starts with the sending of quality statistics management related messages from the quality statistics management device 110 to the quality statistics collecting device 125. The order of the messages 501 to 503 is arbitrary. Messages 503 to 504 and 509 and 514 use the data model from FIGS. 2 and 4. Message 503 corresponds to setting the AutoMonitor attribute 406 of FIG. 4 to TRUE. Message 504 corresponds to setting the SampleEnable attribute 409 of FIG. 4 to TRUE. Message 509 corresponds to setting the UserSampleSeconds attribute 206. Message 514 corresponds to setting the TestSampleSeconds attribute 209. First, a URI (Uniform Resource Identifier) is sent to the device 125, containing information representative of the location of the test stream (here: TEST CH) and how to connect to it. Still, no immediate connection is done. This is different from the functioning of the URI attribute in the existing TR-135 data model, where the simple writing action of an URI attribute triggers the connection to the specified stream by the device 125. According to the invention, the configuration of a connection address for a test stream by a device different than the device executing the quality statistics collection and the action of connection itself to the test stream are separate actions. This allows supporting the second mode of statistics collection, AUTOMATIC-MONITOR mode, besides the first mode of statistics collection, NON-AUTOMATIC-MONITOR mode. Although an immediate connection upon specifying the URI is useful in the standard TR-135 model of functioning, but according to the invention, an automatic connection to a test stream is made in AUTOMATIC-MONITOR mode when resources are available.

The second message 502 sent to the device 125 contains the SampleInterval, already explained at the beginning of this section. The next message 503 enables the second mode of statistics collection, AUTOMATIC-MONITOR mode, in the device 125. The message 504 enables the collection of quality statistics. Now, statistics collection can start. A user action of channel change is illustrated by message 505 (ZAP) from user 500 to device 125. When the user changes channel to a news channel, the device 125 requests the required channel by issuing a connection request to the access network 120, here illustrated by message 506 IGMP JOIN (NEWS CH). IGMP stands for Internet Group Multicast Protocol, which is a protocol that allows connection (join) to and disconnection (leave) of IP multicast streams. Then, the device 125 receives the requested stream (507).

The collected quality statistics are, according to the data model of FIG. 2, stored in the .STBService{i}.ServiceMonitoring object, and the number of seconds that the collection takes place and the device is connected to the user selected stream is stored in UserSampleSeconds, illustrated by action 509.

Then, user 500 puts his device 125 into the standby state. As soon as the device 125 detects that resources are available, the device 125 connects to the test stream that was specified in message 501 (URI) and continues to store quality statistics in the .STBService{i}.ServiceMonitoring object, whereas the number of seconds that the collection takes place is stored in TestSampleSeconds attribute of the object, illustrated by action 514. According to a particular embodiment of the invention, the collected quality statistics are received in the quality statistics management device, illustrated by message 515. This illustrates a step of reception of collected quality statistics.

The figure illustrates a particular embodiment of the invention, where needed resources are considered to be available when a connection to the test stream and a collection of quality statistics on the test stream does not impact the quality of service rendering by said device. Upon reception of the SampleEnable message 504, statistics are collected, and are even continued in the standby state, such as illustrated by the message exchange that is continued after entering the standby state upon message 510.

The figure also shows a particular embodiment of the invention, where the quality statistics management device, implementing the method of management of collection of quality statistics, comprises the sending of information representative of a collection interval to the collecting device 125, by means of message 502.

Figure 6:
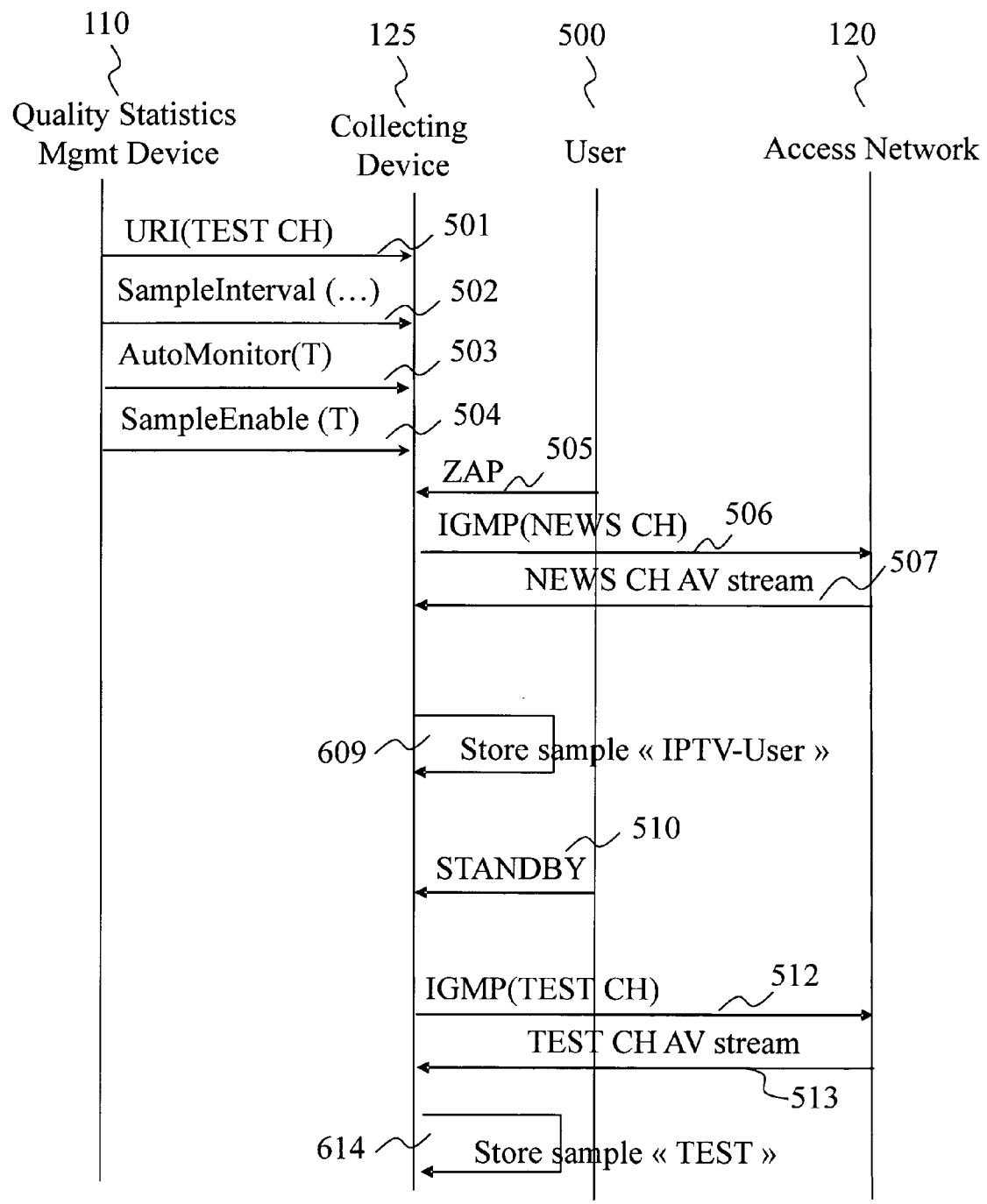

FIG. 6 shows an exchange of messages between the devices of the network infrastructure of FIG. 1 and the user, of an embodiment of the invention using the data model as illustrated by FIG. 3. Illustrated by FIG. 6 is the second mode of statistics collection, that is, AUTOMATIC-MONITOR mode. The figure shows the method of collection of quality statistics by device 125 and the method of management of quality statistics in the quality statistics management device 110.

The common elements with FIG. 5 have already been explained for FIG. 5 and are therefore not explained further here.

Different with FIG. 5 are actions 609 and 614, which illustrate the storing of the collected statistics and the number of seconds that statistics were collected on a test stream and on a user-selected stream in different instances of a .STBService.{i}.ServiceMonitoring.Mainstream{i}. Sample object with the ServiceType attribute set to respectively "IPTV-User" for statistics that were collected while the device 125 was connected to a user-selected stream, and a .STBService.{i}.ServiceMonitoring.Mainstream{i}. Sample object with the ServiceType attribute set to respectively "TEST" for statistics that were collected while the device 125 was connected to the test stream.

According to a different embodiment of the invention, and instead of augmenting the set of values of the ServiceType parameter, a new parameter is added that is called for instance SubServiceType that is used in addition to the existing TR-135 Issue 1 ServiceType parameter, which takes one of the values "USER" or "TEST". The SubServiceType, used together with the legacy (TR-135 Issue 1) ServiceType parameter allows distinguishing two different instances of a MainStream object, one dedicated to user selected stream, one dedicated to a test stream.

According to a particular embodiment illustrated in FIGS. 5 and 6, resources needed for collection of quality statistics are made available in a standby-state of the device 125, illustrated by the continued actions and messages after entering the standby state with user action 510.

According to a particular embodiment illustrated in FIGS. 5 and 6 by actions 509, 514 and 609, 614, the quality statistics are classified according to the type of the stream for which the statistics apply, here illustrated by actions 609 and 614.

According to a particular embodiment of the invention illustrated in FIGS. 5 and 6 by actions 509 and 514, the type of stream comprises a test type stream and a user-selected type stream, represented by respectively "TestSampleSeconds" and "UserSampleSeconds" of FIG. 5 and by ServiceType value "TEST" and "IPTV-User" of FIG. 6.

Figure 7:
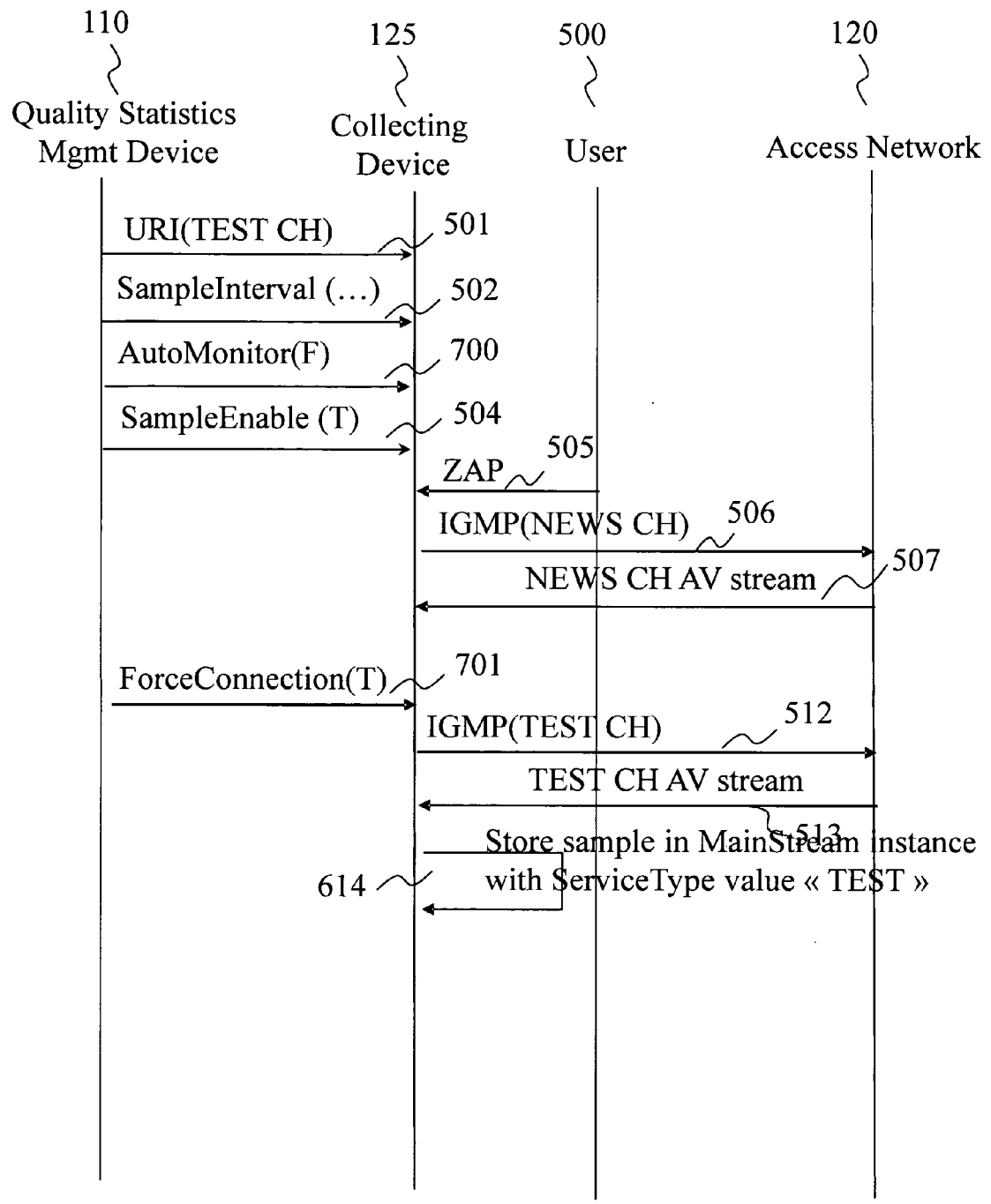

FIG. 7 shows an exchange of messages between the devices of the network infrastructure of FIG. 1 and the user, of an embodiment of the invention using the data model as illustrated by FIG. 3. Illustrated by FIG. 7 is the first mode of statistics collection, that is, NON-AUTOMATIC-MONITOR mode.

The common elements with FIG. 6 have already been explained and are therefore not explained further here.

Different with FIG. 6 are notably the messages "Automonitor(F)" 700, corresponding to 406 of FIG. 4, and "ForceConnection (T)" 701 which are sent to the device 125. Message 700 requests the entering of device 125 into the first mode, NON-AUTOMATIC-MONITOR. In this mode, no automatic connection to a test stream is done. The connection to the test stream is done upon reception of the request signal comprising a request for a connection to a test stream with message 701. The connection to the test stream is then done with message 512. The figure illustrates the sending of a signal to a device requesting a connection to a test stream.

According to a particular embodiment of the invention, a "ForceConnection" attribute is added to the TR-135 data model. The attribute is of the type Boolean, and belongs to the .STBService.{i}.components.FrontEnd.{i}. IP.Service- Connect object. The attribute indicates, when provided with the value TRUE, that the connection is requested to the to a test stream that is specified in the URI parameter that has been set with the help of message 501. Providing a value FALSE has no effect. In fact, if the user proceeds with a channel change action such as a ZAP message illustrated by message 505, but after having received the ForceConnection(T) message 701 that requests a connection to a test stream, the connection to the test stream is undone and replaced by a connection to the user-selected stream.

Figure 8:
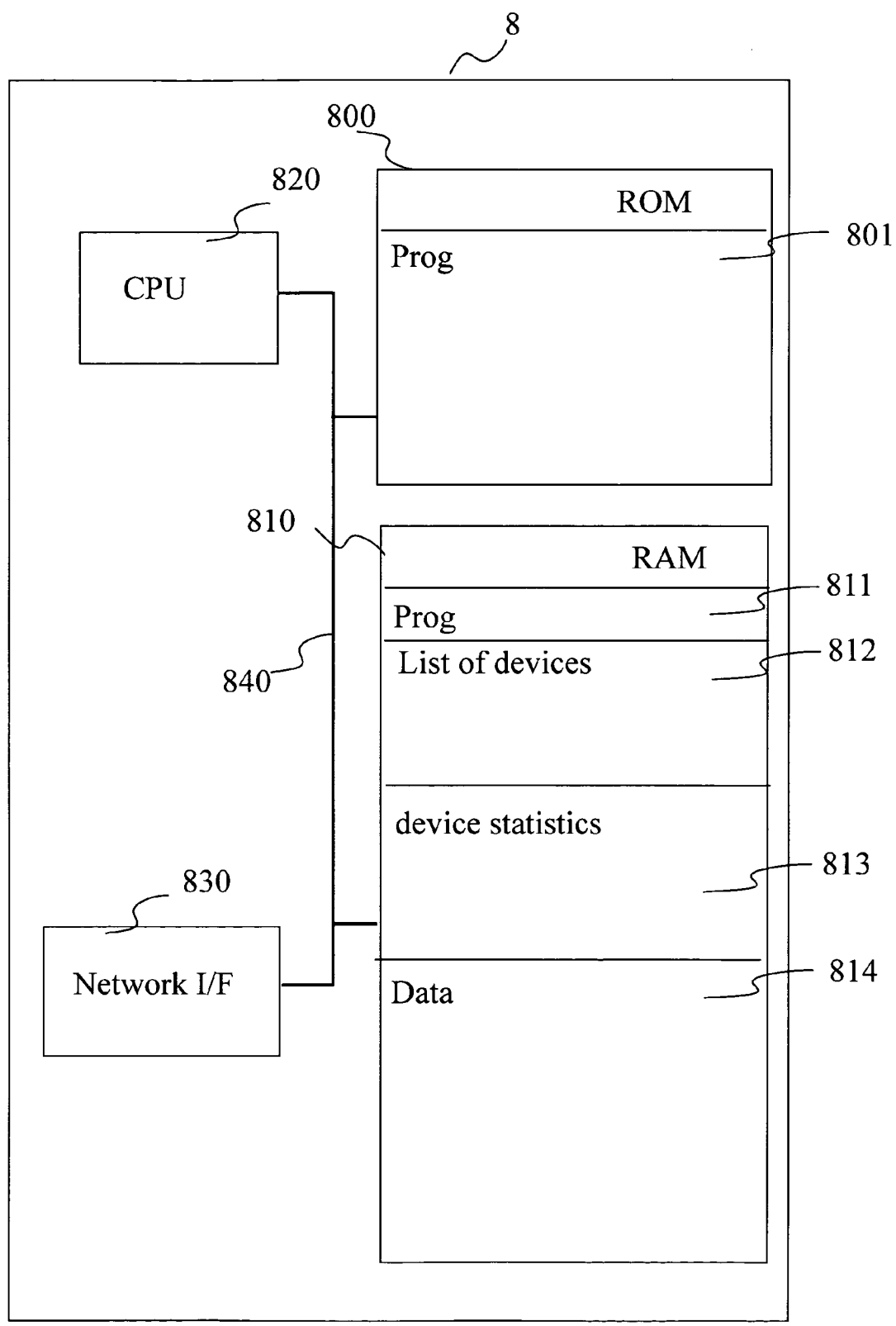
FIG. 8 shows an example quality statistics management device according to the invention.

FIG. 8 illustrates a quality statistics management device 8 according a particular embodiment of the invention. The device corresponds for example to device 110 of FIG. 1. The device 8 comprises the following elements, interconnected by an address and data bus 840:

- a microprocessor 820 (or CPU, for <<Central Processing Unit>>);
- a non-volatile memory of type ROM (<<Read Only Memory>>) 800;
- a read-write memory or RAM (<<Random Access Memory>>) 810; and
- a network interface 830, which is used to connect the device to an operator network such as 117 of FIG. 1.

At power-on, the microprocessor 820 copies a program comprising the instructions of the algorithm implementing the steps of the method of management of collection of quality statistics that is stored in the ROM 800 to RAM register 811 and executes them.

The network interface 830 allows the device to receive and send messages and data over a network connection, such as the connection to operator network 117.

The word <<register>> used in the description of memories 800 and 810 means a low-capacity memory zone (only some binary data) or a high-capacity memory zone (allowing the storage of an entire program or of a large amount of data).

Each of the registers in ROM 800 and RAM 810 can hold a variable number of data of variable size. The read-only memory 800 comprises:

- a register 801, where the program is stored.

The random-access memory 810 comprises:

- a register 811, used for storing the program that it is copied from ROM register 801;
- a register 812, used for storing information representative of a list of devices from where statistics can be collected or is collected from. The information stored here such as: device name, device type, device address.
- a register 813, used for storing the quality statistics received from devices; and
- a register 814 that contains data needed for the functioning of the program stored in RAM register 811, such as temporary variables and data tables.

Figure 9:
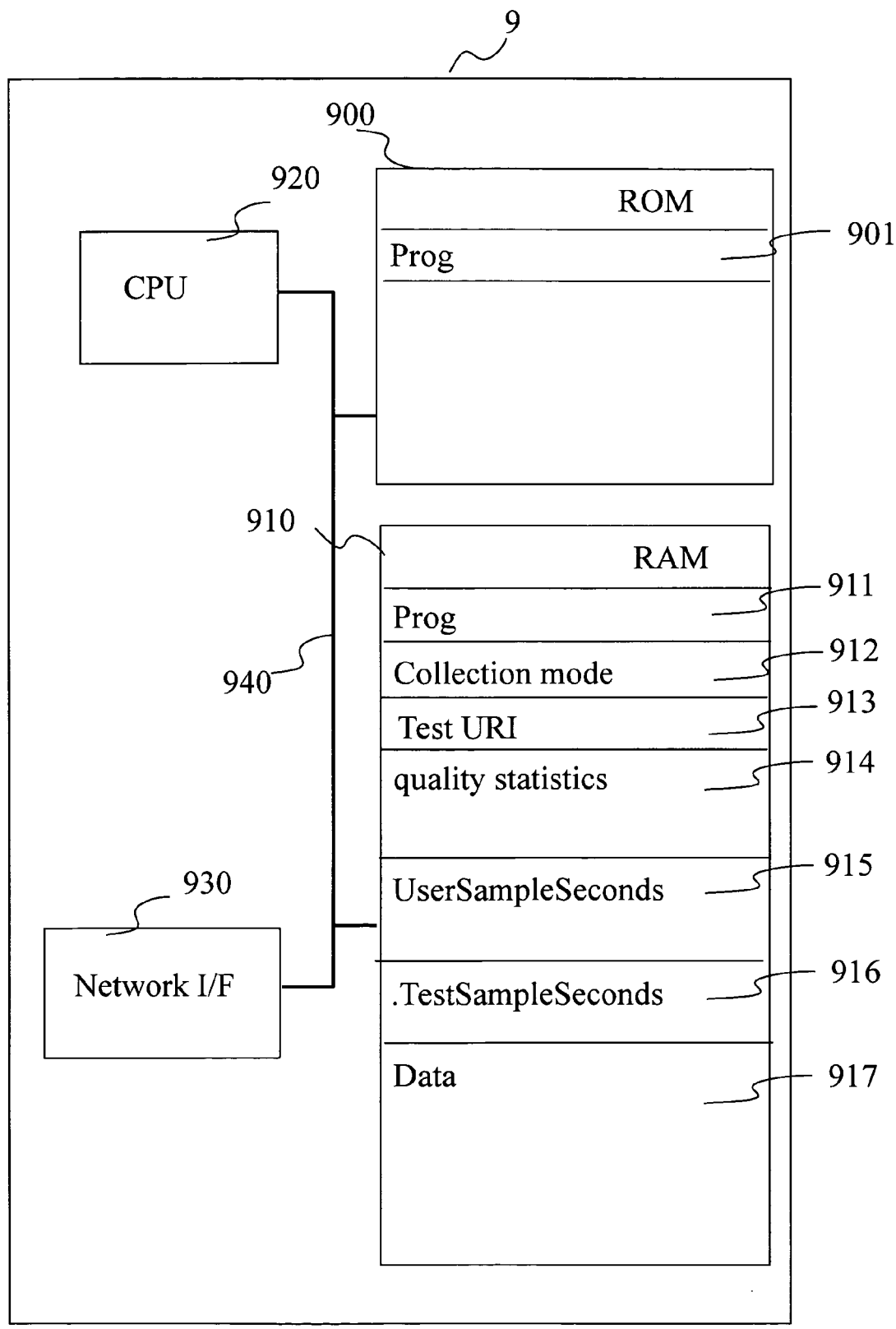
FIG. 9 shows an example quality statistics collecting device according to the invention.

FIG. 9 illustrates collecting device 9 according a particular embodiment of the invention. The device 9 corresponds for example to any of the devices 123, 124 and 125 of FIG. 1. The device 9 comprises the following elements, interconnected by an address and data bus 940:

- a microprocessor 920 (or CPU, for <<Central Processing Unit>>);
- a non-volatile memory of type ROM (<<Read Only Memory>>) 900;
- a read-write memory or RAM (<<Random Access Memory>>) 910; and
- a network interface 930, which is used to connect the device to an access network such as 120 of FIG. 1.

At power-on, the microprocessor 920 copies a program comprising the instructions of the algorithm implementing the steps of the method of collection of quality statistics that is stored in the ROM 900 to RAM register 911 and executes them.

The network interface 930 allows the device to receive and send messages and data over a network connection, such as the access network 120 of FIG. 1.

The word <<register>> used in the description of memories 900 and 910 means a low-capacity memory zone (only some binary data) or a high-capacity memory zone (allowing the storage of an entire program or of a large amount of data).

Each of the registers in ROM 900 and RAM 910 can hold a variable number of data of variable size. The read-only memory 900 comprises:

- a register 901, where the program is stored;

The random-access memory 910 comprises:

- a register 911, used for storing the program that it is copied from ROM register 901;
- a register 912, used for storing information representative of the mode of collection of quality statistics, being first, NON-AUTOMATIC-MONITOR or second, AUTOMATIC-MONITOR mode;
- a register 913, used for storing information representative of the address of the test stream, i.e. the test URI;
- a register 914, used to store the collected statistics;
- a register 915, used to store the number of seconds that statistics were collected while connected to a user-selected stream;
- a register 916, used to store the number of seconds that statistics were collected while connected to a test stream;
- a register 917 that contains data needed for the functioning of the program stored in RAM register 911, such as temporary variables and tables.

According to a particular embodiment of the invention, the registers are organized according to the hierarchy of the data model illustrated by FIG. 2. Then, the RAM 910 comprises a data model object 201, with attributes 206 and 209.

Figure 10:
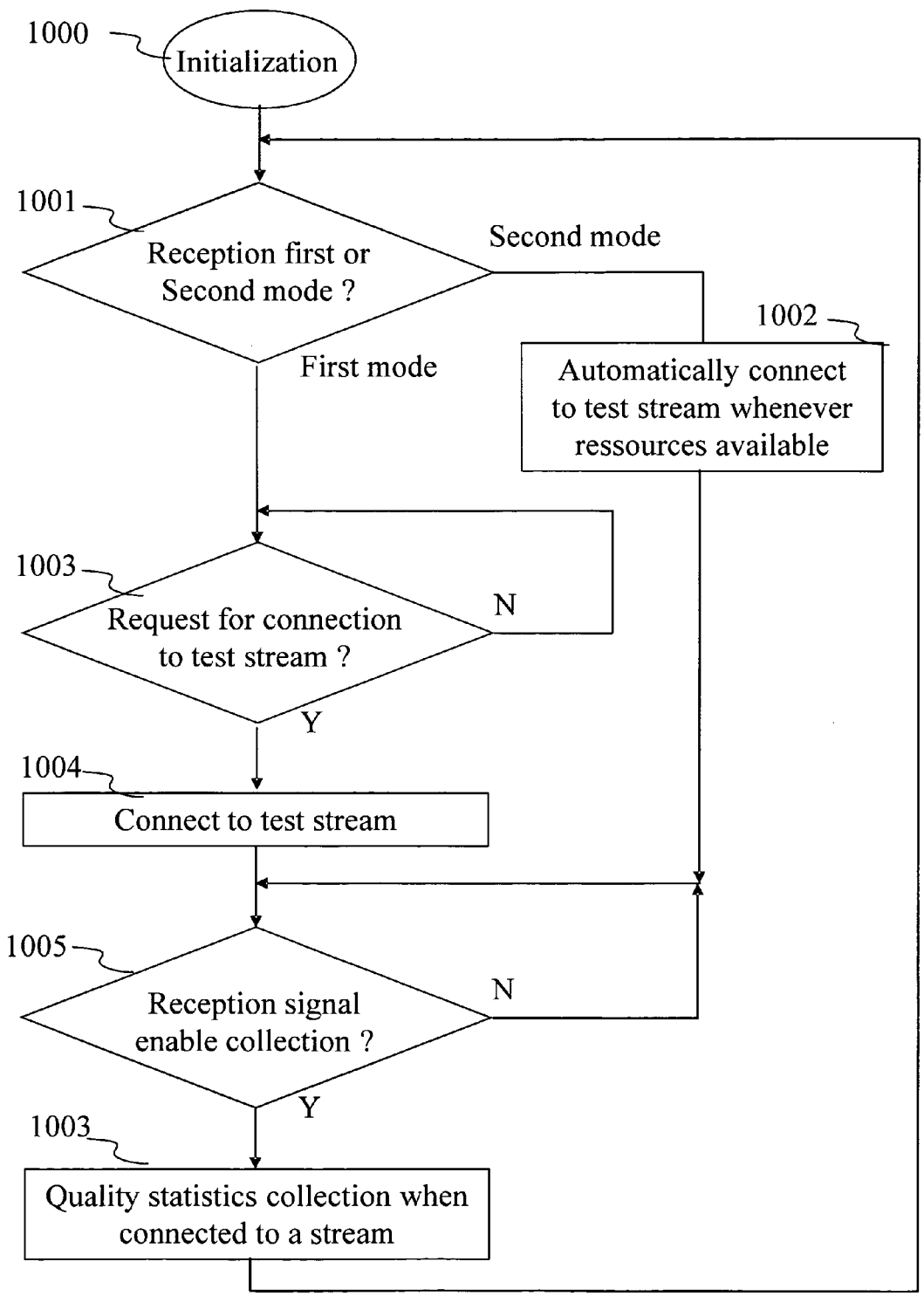
FIG. 10 shows an algorithm of a method of quality statistics collection by a device according to the invention.

FIG. 10 shows an algorithm of quality statistics collection according to a particular embodiment of the invention, such as implemented by device 9 of FIG. 9.

The CPU 920 loads the program containing the algorithm from ROM memory 900 to RAM memory 910 and starts the program. The algorithm starts with initialization step 1000, where all variables needed for the algorithm are initialized.

In test 1001, device 9 determines if a signal comprising an information representative of a mode of collection of quality statistics, so-called requested mode, is received. The said requested mode has at least two possible values comprising a first mode and a second mode.

If the requested mode is the first mode, i.e. NON-AUTOMATIC-MONITOR, the algorithm continues with test 1003.

If the requested mode is the second mode, i.e. AUTOMATIC-MONITOR, a connection to the test stream specified in the Test URI attribute such as stored in register 913 of FIG. 9 is automatically made in step 1002 whenever resources of device 9 needed for collection of quality statistics are available. Then, test 1005 is executed.

In test 1003, in the first mode, it is determined if a signal is received that comprises a request for a connection to a test stream. The step is repeated if no such signal is received. If such signal is received, a connection to test stream is made in step 1004 and test 1005 is executed.

Then, in test 1005, it is determined if a signal is received that enables the quality collection. The test is repeated if no such signal is received. If such a signal is received, the quality statistics collection is executed when connected to a stream, being user-selected or test. Then the algorithm restarts with step 1001.

When quality statistics are collected, they can be sent to and received by a device that requests to read them, such as quality statistics management device 110 of FIG. 1, implemented by device 8 of FIG. 8.

Figure 11:
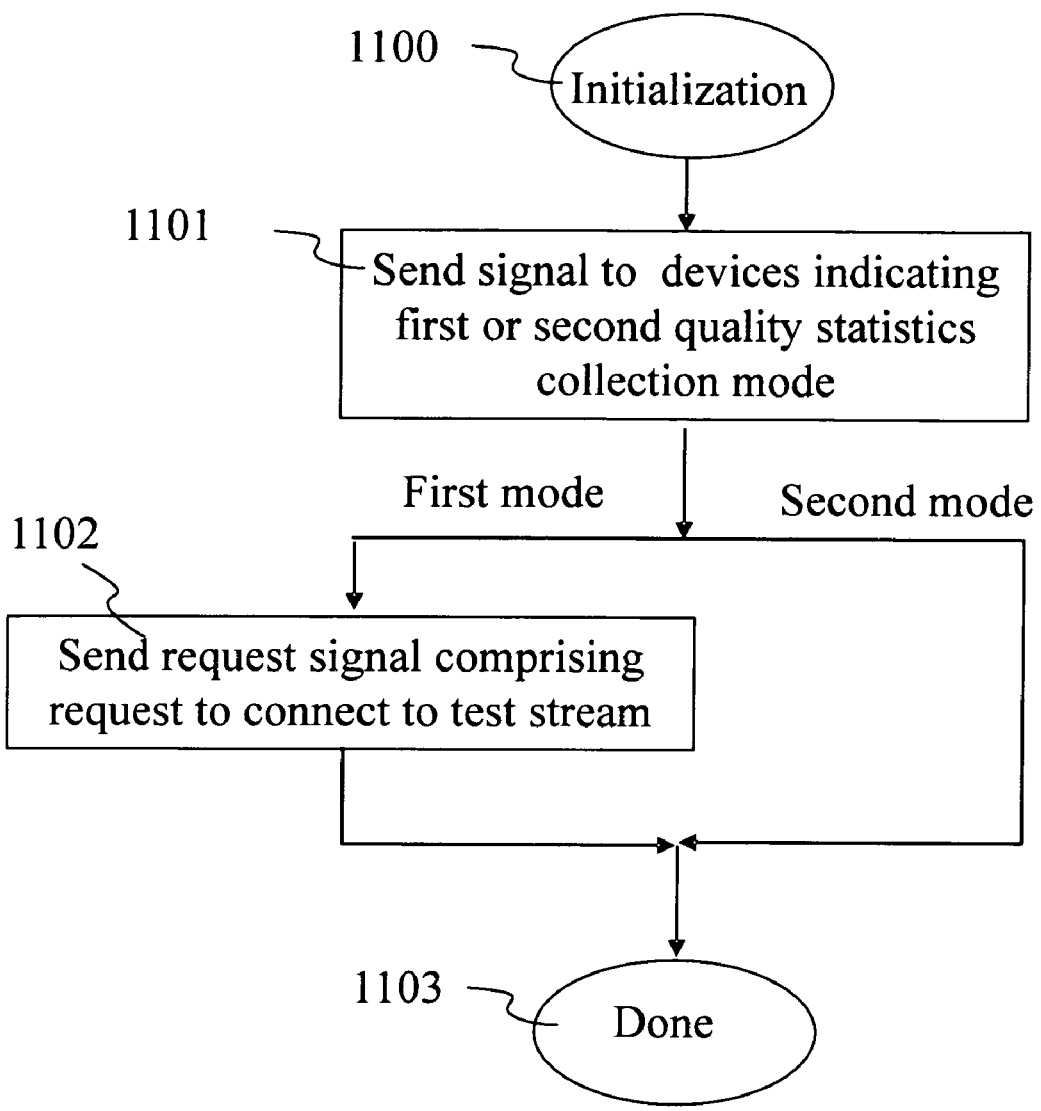
FIG. 11 shows an algorithm of a method of quality statistics management by a quality statistics management device according to the invention.

FIG. 11 shows an algorithm of quality statistics collection management according to a particular embodiment of the invention, such as implemented by device 8 of FIG. 8.

The CPU 820 loads the program containing the algorithm from ROM memory 800 to RAM memory 810 and starts the program. Quality statistics collection management starts with initialization step 1100, where all variables needed for the algorithm are initialized. In step 1101, a signal comprising information representative of a mode of collection of quality statistics is sent, that requests devices to enter the first mode, or the second mode. In the first mode, a request signal is sent to the collecting devices to connect to a test stream, illustrated by step 1102. In the second mode, no such signal is sent. The algorithm finishes with step 1103.

According to a particular embodiment of the invention quality statistics collected according to the method illustrated by FIG. 10 and according to the quality statistics management method illustrated by FIG. 11 are represented by raw data. According to another particular embodiment, quality statistics are represented by data that is extracted from raw data. According to another particular embodiment of the invention, quality statistics are represented by both raw and extracted data. According to a variant embodiment of the invention, raw data for quality statistics comprises measurements of lost frames of data, the frame rate of a received stream, the number of decoded frames, the number of reception and decoder buffer underruns and/or number of buffer overruns. According to another variant embodiment of the invention, data extracted from raw data comprises the mean number of lost frames, the Gaussian distribution of buffer underruns related to the frame rate. According to a yet another particular embodiment of the invention, raw data statistics collected from at least one device are retrieved in another device where statistic data is extracted from the raw data. The above described particular embodiments can be combined into form an embodiment with particular advantages.

The reader of the present document will understand that the described embodiments are given as example embodiments of the invention, and thereby the invention is not limited to these embodiments.

The infrastructure of FIG. 1 is illustrated as an example embodiment. Other infrastructures are possible that are compatible with the invention, with additional or less devices; some functions provided by the different devices as illustrated here can be combined in single devices. Likewise, functions provided by a single device can be separated and provided by different devices. According to a particular embodiment of the invention, the device sending the requests for putting at least one other device into first or second collection mode is not the same device that retrieves the collected quality statistics. According to a particular embodiment of the invention, the operator network comprises other devices needed for its functioning: transmitter equipment, traffic and billing management equipment. In a particular embodiment of the invention, the operator network typically comprises more or less than the three devices shown. In a particular embodiment of the invention, other network equipment is needed comprising network switches and routers. According to a particular embodiment of the invention, a DSLAM (Digital Subscriber Line Access Multiplexer) is be present on the access network and the devices need an ADSL (Asynchronous Digital Subscriber Line) type modem, either external or internal, to connect to the access network. According to a particular embodiment of the invention, devices access a same operator via different access networks. According to a particular embodiment of the invention, devices have a secondary interface, allowing them to receive DTT (Digital Terrestrial TV) receptions besides the services that are provided by the access network. According to a particular embodiment of the invention device is be directly connected to an access network, comprising an IPTV receiver connected to an ADSL network, and a mobile telephone connected to a wireless 3GPP access network.

According to a particular embodiment of the invention, devices have the resources that allow it to record a program and watch another at the same time. According to a particular embodiment of the invention, devices can be of a dedicated type, comprising an STB (Set Top Box) and a PC (Personal Computer) type.

The steps of the collection method are not necessarily to be executed in the listed order. For example, the connection to the test stream in first mode is dependent on the reception of a signal indicating a request to connect to the test stream, and does not necessarily precede the step of collection of statistics.

Though the invention is described using the examples of the standards TR-69 and TR-135 and their data models as a framework, the invention is not limited to application in the field of the cited protocols and architectures, such as TR-69 and TR-135 but can also be applied to other proprietary or standardized protocols and architectures when one wants to collect and manage quality statistics, such as SNMP (Simple Network Management Protocol, specified by the Internet Engineering Task Force IETF. SNMP exposes managementy data in the form of variables on the managed systems, which describe the system configuration. These variables can be queried and set by managing applications. Likewise, the methods according to the invention do not necessarily need the implementation of a data model, for example, a message exchange protocol can be used that defines specific HTPP messages to send and receive signals and quality statistics according to the invention.

The invention claimed is:

1. A method of collection of quality statistics, wherein the method comprises the following steps, implemented by a quality statistics collecting device, referred to as first device:
   reception of a collection mode signal comprising an information representative of a mode of collection of quality statistics, so-called requested mode, said requested mode having at least two possible values comprising a first mode and a second mode;
   if the requested mode is the first mode, entering in the first mode;
   if the requested mode is the second mode, entering in the second mode;
   in the first mode, connection to a test stream upon reception of a request for connection signal comprising a request for connection to said test stream;
   in the second mode, automatic connection to a test stream whenever resources of said first device needed for said collection of quality statistics are available;
   collection of quality statistics when said collection of quality statistics has been enabled by reception of a quality statistics collection enable signal enabling said collection of quality statistics and when said first device is connected to a stream.

2. The method according to claim 1, wherein said test stream of said second mode is a parameter that is configurable by a second device different than said first device.

3. The method according to claim 1, wherein said resources of said first device needed for said collection of quality statistics are considered to be available when a connection to said test stream and said collection of quality statistics on said test stream does not impact the quality of service rendering by said first device.

4. The method according to claim 1, wherein said resources of said first device needed for said collection of quality statistics are considered to be available when said first device is not connected to a stream coming from a Wide Area Network whereby a distinction between a stream coming from the Wide Area Network and a stream not coming from the Wide Area Network is made by comparing a source IP address of the stream with the IP address of said first device.

5. The method according to claim 1, wherein the said resources of said first device needed for said collection of quality statistics are made available in a stand-by state of said first device.

6. The method according to claim 1, wherein said quality statistics are classified according to a type of stream for which said quality statistics apply.

7. The method according to claim 6 wherein said type of stream comprises a test type stream and a user-selected type stream.

8. The method according to claim 1, wherein said quality statistics belong to a set comprising quality of service and quality of experience.

9. The method according to claim 1, wherein said quality statistics concern audio and video type services.

10. A method of management of collection of quality statistics, wherein the method comprises following steps, implemented by a quality statistics management means:

sending of a collection mode signal to at least one quality statistics collecting device comprising an information representative of a mode of collection of quality statistics, so-called requested mode, the said requested mode having at least two possible values comprising a first mode and a second mode;

in the first mode, sending of a request for connection signal to said at least one quality statistics collecting device comprising a request for connection to a test stream;

wherein in the first mode, a connection of said at least one quality statistics collecting device to a test stream is made upon reception of the request for connection signal; and wherein in the second mode, a connection of said at least one quality statistics collecting device to the test stream is automatically made whenever resources of said at least one quality statistics collecting device needed for said collection of quality statistics are available.

11. The method according to claim 10, wherein the method comprises a step of reception of collected quality statistics from said at least one quality statistics collecting device.

12. The method according to claim 10, wherein the method comprises a step of sending of information representative of a collection interval, to said at least one quality statistics collecting device.

13. The method according to claim 10, wherein a signal requesting a connection to a test stream is sent to said at least one quality statistics collecting device.

14. The method according to claim 10, wherein said quality statistics are classified according to a type of stream for which said quality statistics apply.

15. The method according to claim 14, wherein said type of stream comprises a test type stream and a user-selected type stream.

* * * * *